United States Patent
Lenherr

(10) Patent No.: US 9,404,597 B2
(45) Date of Patent: Aug. 2, 2016

(54) GAS METERING DEVICE WITH SPRING LOADING DEVICE HAVING SERIALLY ARRANGED SPRINGS

(71) Applicant: VAT Holding AG, Haag (CH)

(72) Inventor: Bruno Lenherr, Gams (CH)

(73) Assignee: VAT HOLDING AG, Haag (CH)

( * ) Notice: Subject to any disclaimer, the term of this patent is extended or adjusted under 35 U.S.C. 154(b) by 196 days.

(21) Appl. No.: 13/683,060

(22) Filed: Nov. 21, 2012

(65) Prior Publication Data

US 2013/0126772 A1    May 23, 2013

(30) Foreign Application Priority Data

Nov. 22, 2011    (DE) .......................... 10 2011 119 035

(51) Int. Cl.
| | | |
|---|---|---|
| F16K 21/16 | (2006.01) | |
| F16K 1/54 | (2006.01) | |
| F16K 7/16 | (2006.01) | |

(52) U.S. Cl.
CPC . *F16K 21/16* (2013.01); *F16K 1/54* (2013.01); *F16K 7/16* (2013.01)

(58) Field of Classification Search
CPC ........... F16K 21/16; F16K 1/36; F16K 21/10; F16K 1/54; F16K 7/16
USPC .................. 137/529, 530, 524; 251/337, 336, 251/129.18; 267/255, 287, 289, 177, 28
See application file for complete search history.

(56) References Cited

U.S. PATENT DOCUMENTS

| | | |
|---|---|---|
| 1,814,045 A | 7/1931 | Kay |
| 2,014,642 A | 9/1935 | Andrews |
| 2,220,479 A | 11/1940 | DeBell |
| 2,303,130 A | 11/1942 | Moon |
| 2,497,557 A | 2/1950 | Reeves |
| 2,694,410 A | 11/1954 | Ey |

(Continued)

FOREIGN PATENT DOCUMENTS

| | | |
|---|---|---|
| AT | 413134 | 11/2005 |
| CH | 600224 | 12/1977 |

(Continued)

OTHER PUBLICATIONS

AT413134—Claims-en—English translation of the claims of Foreign document AT413134 provided by the applicant.*

(Continued)

*Primary Examiner* — Craig Schneider
*Assistant Examiner* — Josephine Trinidad-Borges
(74) *Attorney, Agent, or Firm* — Volpe and Koenig, P.C.

(57) ABSTRACT

A gas metering valve (1) having at least one valve seat (2) and at least one closure member (3) which can be pressed against the valve seat, the closure member in a maximum open position is raised at least in regions from the valve seat (2) and in a maximum closed position is pressed against the valve seat. The gas metering valve (1) has an adjusting device (5) which is spring-loaded by a spring loading device (4) of the gas metering valve (1) for adjusting the closure member (3) in a closing direction (6) from the maximum open position into the maximum closed position. The spring loading device (4) of the adjusting device (5), preferably when viewed in the closing direction (6), has at least two spring bodies (7a, 7b) which are connected mechanically in series, the spring bodies (7a, 7b) have elastic characteristics which are different from each other.

17 Claims, 3 Drawing Sheets

(56) References Cited

U.S. PATENT DOCUMENTS

| | | | |
|---|---|---|---|
| 2,855,154 A | 10/1958 | Tyler et al. | |
| 2,989,283 A | 6/1961 | Klingler | |
| 3,211,416 A | 10/1965 | Billeter et al. | |
| 3,330,479 A | 7/1967 | Vollprecht | |
| 3,391,901 A | 7/1968 | Wheeler et al. | |
| 3,487,852 A * | 1/1970 | Kikendall | 137/514.5 |
| 3,656,709 A | 4/1972 | Shufflebarger et al. | |
| 3,709,431 A | 1/1973 | Channell et al. | |
| 4,172,581 A | 10/1979 | Lobach | |
| 4,549,719 A | 10/1985 | Baumann | |
| 4,903,938 A | 2/1990 | Nishizawa et al. | |
| 5,427,139 A * | 6/1995 | Hilton | 137/504 |
| 5,556,072 A | 9/1996 | Itoi et al. | |
| 5,617,890 A | 4/1997 | Brehm et al. | |
| 5,975,488 A * | 11/1999 | Imhof | H01F 7/1607 251/129.1 |
| 6,076,804 A | 6/2000 | Cabrera | |
| 6,182,943 B1 * | 2/2001 | Steinruck et al. | 251/129.16 |
| 6,868,994 B2 | 3/2005 | Kawolics | |
| 2003/0051754 A1 * | 3/2003 | Kirkman et al. | 137/501 |
| 2004/0060600 A1 * | 4/2004 | Choate et al. | 137/529 |
| 2005/0279956 A1 * | 12/2005 | Berger et al. | 251/77 |
| 2006/0076528 A1 | 4/2006 | Tokuda et al. | |
| 2009/0065725 A1 | 3/2009 | Lenherr | |

FOREIGN PATENT DOCUMENTS

| | | | |
|---|---|---|---|
| DE | 1899233 | 8/1964 | |
| DE | 221808 | 5/1985 | |
| DE | 3616828 A1 * | 11/1987 | F16F 1/041 |
| DE | 3932715 | 4/1991 | |
| DE | 4417184 | 11/1995 | |
| DE | 102004028968 | 1/2006 | |
| DE | 102007042854 | 3/2009 | |
| EP | 2034226 | 3/2009 | |
| FR | 2735836 | 12/1996 | |
| JP | 200968706 | 7/2010 | |

OTHER PUBLICATIONS

AT413134—Desc-en—English translation of the description of Foreign document AT413134 provided by the applicant.*

DE 3616828 English Translation of the description as obtained from Espacenet.*

Pfeiffer Vacuum, Operating Manual, All-metal regulating valve UDV-040, Installation Operation Technical Data Maintenance.

* cited by examiner

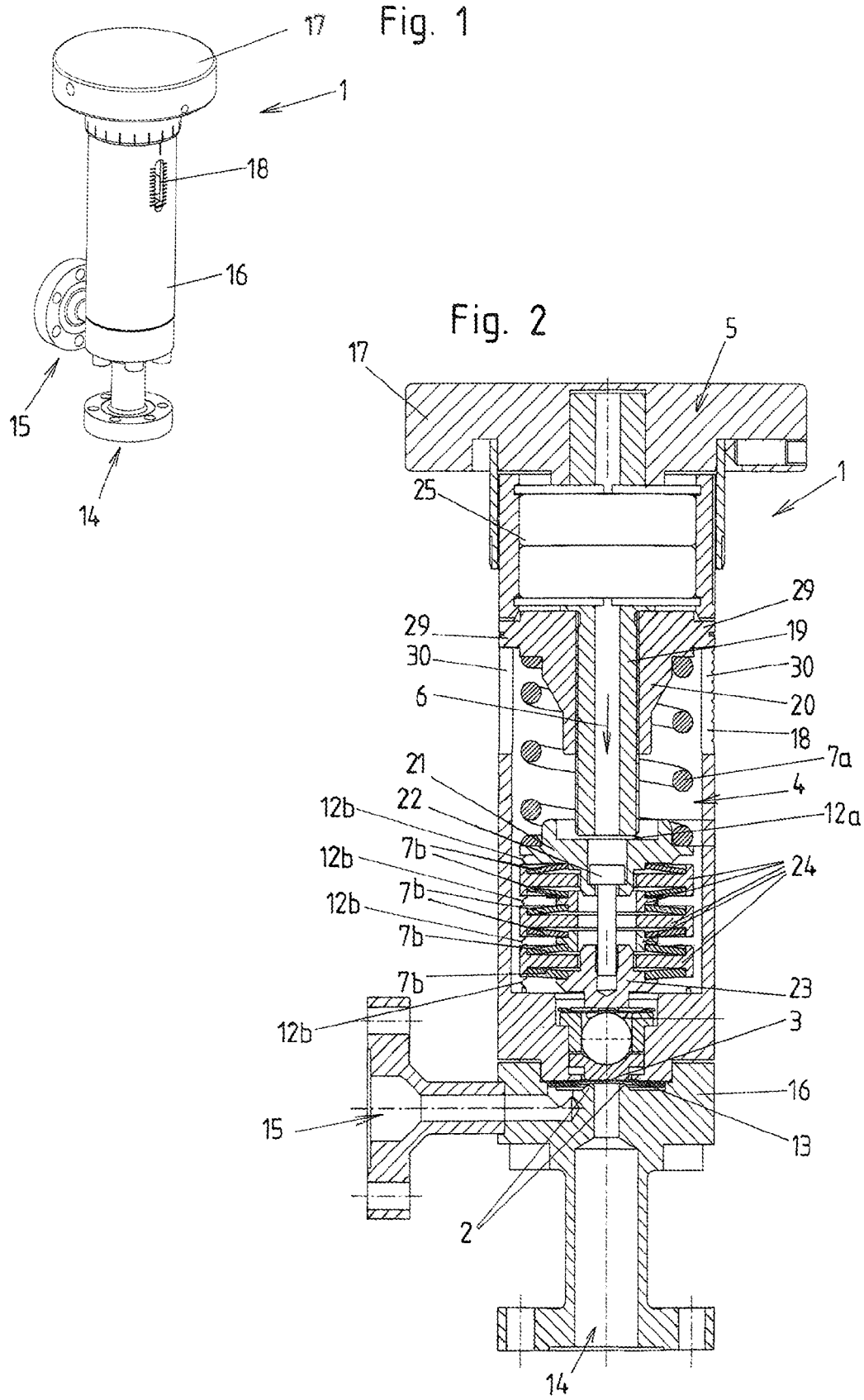

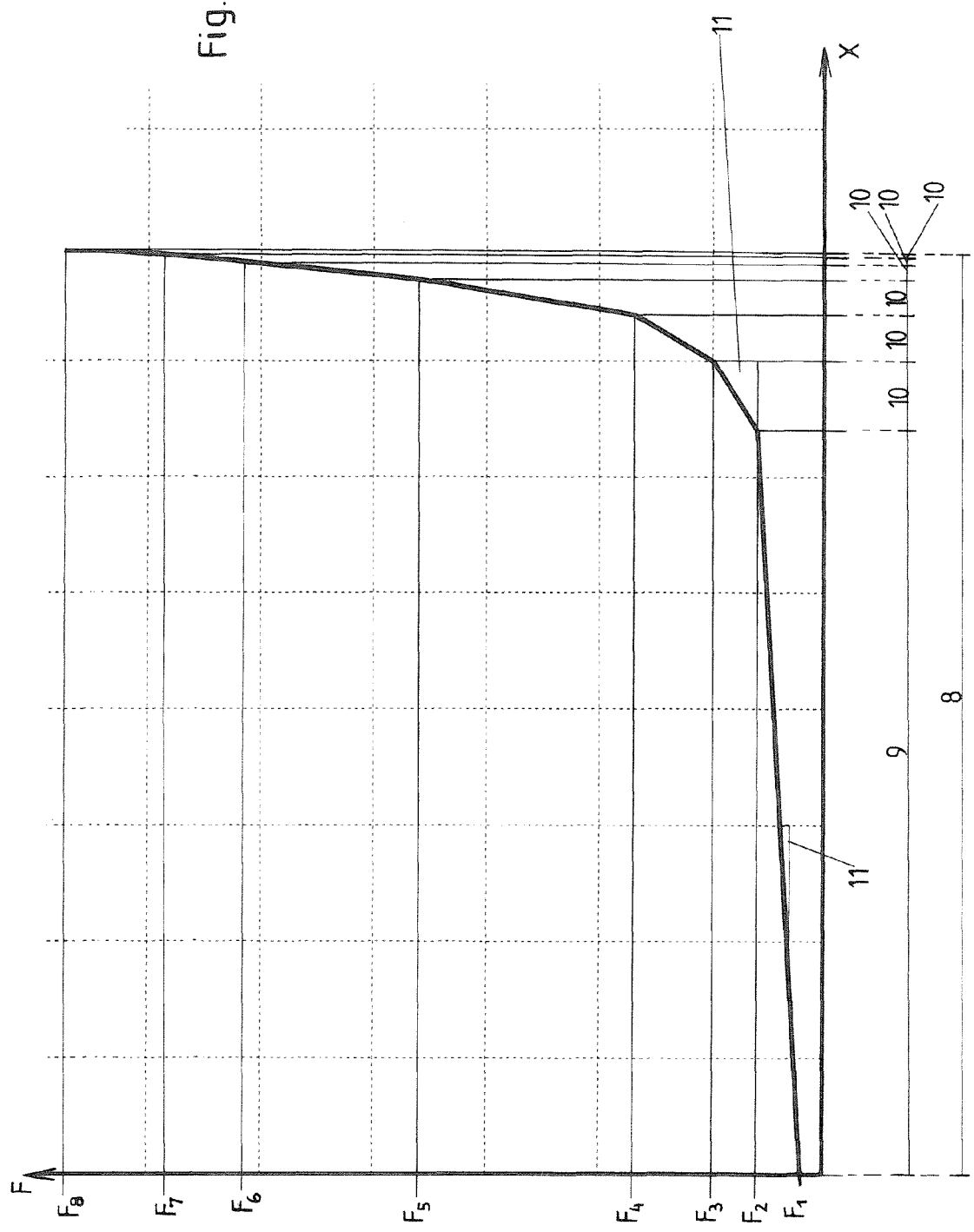

GAS METERING DEVICE WITH SPRING LOADING DEVICE HAVING SERIALLY ARRANGED SPRINGS

INCORPORATION BY REFERENCE

The following documents are incorporated herein by reference as if fully set forth: German Patent Application No. DE 10 2011 119 035.3, filed Nov. 22, 2011.

BACKGROUND

The present invention relates to a gas metering valve having at least one valve seat and at least one closure member which can be pressed against the valve seat, wherein the closure member in a maximum open position is raised at least in regions from the valve seat and in a maximum closed position is pressed against the valve seat, wherein the gas metering valve has an adjusting device which is spring-loaded by means of a spring loading device of the gas metering valve for adjusting the closure member in a closing direction from the maximum open position into the maximum closed position.

Generic gas metering valves are used above all in so-called vacuum technology where technically demanding production processes run in an artificially realized, extensively gas-free chamber. The generic gas metering valves are required, for example, for the purpose of actively supplying a precisely metered amount of a gaseous reaction partner during a production or further processing process or of holding the pressure in the closed reaction chamber at a predetermined level. As a result of said problem definition, said gas metering valves, on the one hand, still have to close reliably and in a permanently metallic sealing manner even in the region of very high negative pressure and, on the other hand, still have to enable fine metering of gases under these conditions. This results in very high demands for precision during the manufacture of the gas metering valves.

A generic gas metering valve is known from U.S. Pat. No. 4,903,938. The disadvantage of the valve shown there, however, is that it is very susceptible to temperature.

SUMMARY

It is the object of the invention to develop a generic gas metering valve which, with as simple a mechanical design as possible, enables precise metering of the gas flow in a reliable manner even under the most varied basic conditions.

This is achieved as claimed in the invention by the spring loading device of the adjusting device, preferably when viewed in the closing direction, having at least two spring bodies which are connected mechanically in series, wherein the spring bodies have elastic characteristics which are different from each other.

A basic concept of the invention, consequently, is connecting at least two spring bodies mechanically in series, which results in spring characteristics, which are adapted in each case but are different from each other, being able to be made available over the closing path. The term connected mechanically in series, in this case, means that the springs are supported against each other in a direct or indirect manner. In the majority of cases, they are arranged locally one behind the other for this purpose. Particularly preferred developments provide that always essentially only one of the spring bodies acts along a certain partial path of the closing path or the elastic characteristics thereof are only effective along said certain partial path. In other words, the springy characteristics of the spring loading device along the respective partial path are determined essentially by only one of the spring bodies or are dominated by said body.

In principle, all elastic bodies known in the prior art are considered as spring bodies. They can, in principle, also be gas pressure or hydraulic springs. However, mechanical spring bodies such as, for example, cup springs or helical springs or elastomer bodies are used in a particularly preferred manner. In order to achieve high temperature resistance up to 300° C., spring bodies of stainless steel or high-grade steel are preferably used. In all cases it is important that the spring characteristics or the elastic characteristics of the spring bodies used are reproducible and are as little dependent on environmental influences and consequently in particular on the temperature as possible.

The closing path is that path or lift of the adjusting device which it covers when the closure member is moved in the closing direction from its maximum open position into its maximum closed position. The lift carried out at the same time by the closure member, in this case, does not have to correspond in particular in its length or lifting height to the closing path. As a rule, the lift of the closure member between its completely open position and a first complete abutment of the closure member against the valve seat, which can correspond to a first partial path of the adjusting device, is smaller than said partial path of the closing path. Between the first complete abutment of the closure member and the maximum closed position it can be provided that, at this location, the closure member hardly carries out any more lift or absolutely no longer carries out any more lift, but is just elastically deformed in order to achieve the desired pressure resistance for the sealing in the maximum closed position. The further partial path of the adjusting device corresponding to this, however, is, as a rule, definitely measurable and substantially greater than the still present or no longer measurable remaining lift of the closure member between its first complete abutment of the closure member and its maximum closed position. To complete the picture, reference is again made to the fact that the closure member in the completely open position is able to be raised completely but only in regions from the valve seat. The closing path of the adjusting device is measured in a favorable manner at a position of the adjusting device which is arranged in or on the actuator or between the actuator of the adjusting device and the first spring body of the spring loading device, as there the measuring of the closing path is not yet over-influenced by the elastic characteristics of the spring bodies. The term "the first complete abutment of the closure member against the valve seat" refers to that intermediate position of the closure member between its maximum open position and its maximum closed position, where when the closure member is closed said closure member abuts against the valve seat completely for the first time. Between the maximum open position and the first complete abutment of the closure member against the valve seat, the closure member is raised at least in regions from the valve seat.

The most varied variants of the adjusting devices for adjusting the closure member are possible. For example, the adjusting device can be actuated by hand. Consequently, it can have, for example, a manual turning handle as actuator, by way of which the amount of gas to be metered can be adjusted manually at the gas metering valve. These variants are above all favourable whenever the gas flow only has to be adjusted relatively infrequently. If the gas metering valve has to be adjusted more frequently, electrical, piezo-electrical, pneumatic or hydraulic actuators of the adjusting device can also be used, for example. These can also be used above all whenever the gas from the metering valve is arranged at a position which is difficult to access from the outside.

Preferred development forms of the invention provide that the adjusting device, when adjusting the closure member in the closing direction, is movable along the closing path, wherein at least one of the spring bodies is realized so as to be more flexible and acts at least primarily on a first partial path of the closing path, preferably when the closure member is situated in at least one state between the maximum open position and a first complete abutment of the closure member against the valve seat, and at least one other of the spring bodies is realized so as to be more rigid than the more flexible spring body and acts at least primarily on a further partial path of the closing path, preferably when the closure member is situated in at least one state between the first complete abutment of the closure member against the valve seat and the maximum closed position.

In terms of fine metering of the gas flow, it is favourable when the spring loading device, preferably at least one of the spring bodies, along the first partial path of the closing path, preferably when the closure member is situated in at least one state between the maximum open position and the first complete abutment of the closure member against the valve seat, has a spring characteristic with a maximum gradient of 25 Newtons per millimeter closing path, preferably a maximum of 20 Newtons per millimeter closing path. In terms of optimum metering of the pressing pressure of the closure member against the valve seat, it is provided in a favourable manner that the spring loading device, preferably at least one of the spring bodies, along a further partial path of the closing path, preferably when the closure member is situated in at least one state between a first complete abutment of the closure member against the valve seat and the maximum closed position, has a spring characteristic with a gradient of between 100 Newtons per millimeter closing path and 1000 Newtons per millimeter closing path, preferably between 200 Newtons per millimeter closing path and 800 Newtons per millimeter closing path. The forces to be measured in the case of said specifications are determined at the closure member, the closing path or the partial paths thereof, as stated, are to be measured at the adjusting device.

In the case of the series connection of the various spring bodies as claimed in the invention, it is favourable when the spring characteristics of the entire spring loading device are determined at least primarily at low forces from the weakest spring body or from the most flexible spring body. The more rigid spring bodies operate in a favourable manner within said range of lower forces substantially as rigid bodies. Their spring characteristics at said low forces preferably hardly influence the elastic characteristics of the spring loading device. In order to have elastic characteristics which are as defined as possible even at higher forces, it is provided in a preferred manner that, from a certain path, the more flexible spring bodies no longer influence the elastic characteristics of the spring loading device. It could, therefore, be said that is worthwhile for certain partial paths of the closing path to be excluded from the influence of certain spring bodies. This can be achieved by at least one of, and preferably each of, the spring bodies having associated therewith, preferably in each case, at least one stop of the adjusting device, wherein, from reaching the stop, continued adjusting of the closure member in the closing direction is uninfluenced by the spring body with which the stop is associated. As soon as the corresponding stops are reached, in the case of said development forms, the spring body associated with said stop or said stops no longer influences the elastic characteristics of the spring loading device in the closing direction. The spring body is, as it were, short-circuited or deactivated by the abutment of the stop or of the stops against each other. In terms of a slim design of the gas metering valve, preferred development forms provide that the spring bodies are arranged coaxially with respect to each other. The closing path extends in preferred development forms in a linear manner, preferably completely.

Particularly preferred development forms of the invention provide that spiral springs and/or cup springs are used as spring bodies. In a preferred manner, these are produced from metal, in terms of high thermal stability in a preferred manner from stainless steel, that is to say rust-resistant steel, or high-grade steel.

A preferred exemplary embodiment of the invention provides that at least one of the spring bodies is realized as a spiral spring and acts at least primarily on a first partial path of the closing path, preferably when the closure member is situated in at least one state between a maximum open position and a first complete abutment of the closure member against the valve seat, and at least one other of the, preferably several other, spring bodies is or are realized as a cup spring and acts or act at least primarily on a further partial path of the closing path, preferably when the closure member is situated in at least one state between the first complete abutment of the closure member against the valve seat and the maximum closed position.

In order to set a defined counter force against the adjusting device in the opening direction, particularly preferred development forms of the invention provide that the gas metering valve has at least one opening spring which spring-loads the closure member in opposition to the closing direction. The opening spring can be arranged in the region of the valve seat. In a particularly preferred manner, it is situated on the side of the closure member opposite to the adjusting device. The opening spring can abut directly against the closure member. It can be a cup spring, for example.

BRIEF DESCRIPTION OF THE DRAWINGS

A preferred embodiment of the invention is shown in the figures, in which:

FIG. 1 shows a perspective view from the outside of the exemplary embodiment as claimed in the invention of a gas metering valve;

FIG. 2 shows a longitudinal section through said gas metering valve in the maximum open position;

FIG. 5 shows a diagrammatic representation of the spring characteristic of the spring loading device of the exemplary embodiment shown of the gas metering valve.

DETAILED DESCRIPTION OF THE PREFERRED EMBODIMENTS

Figure 3:
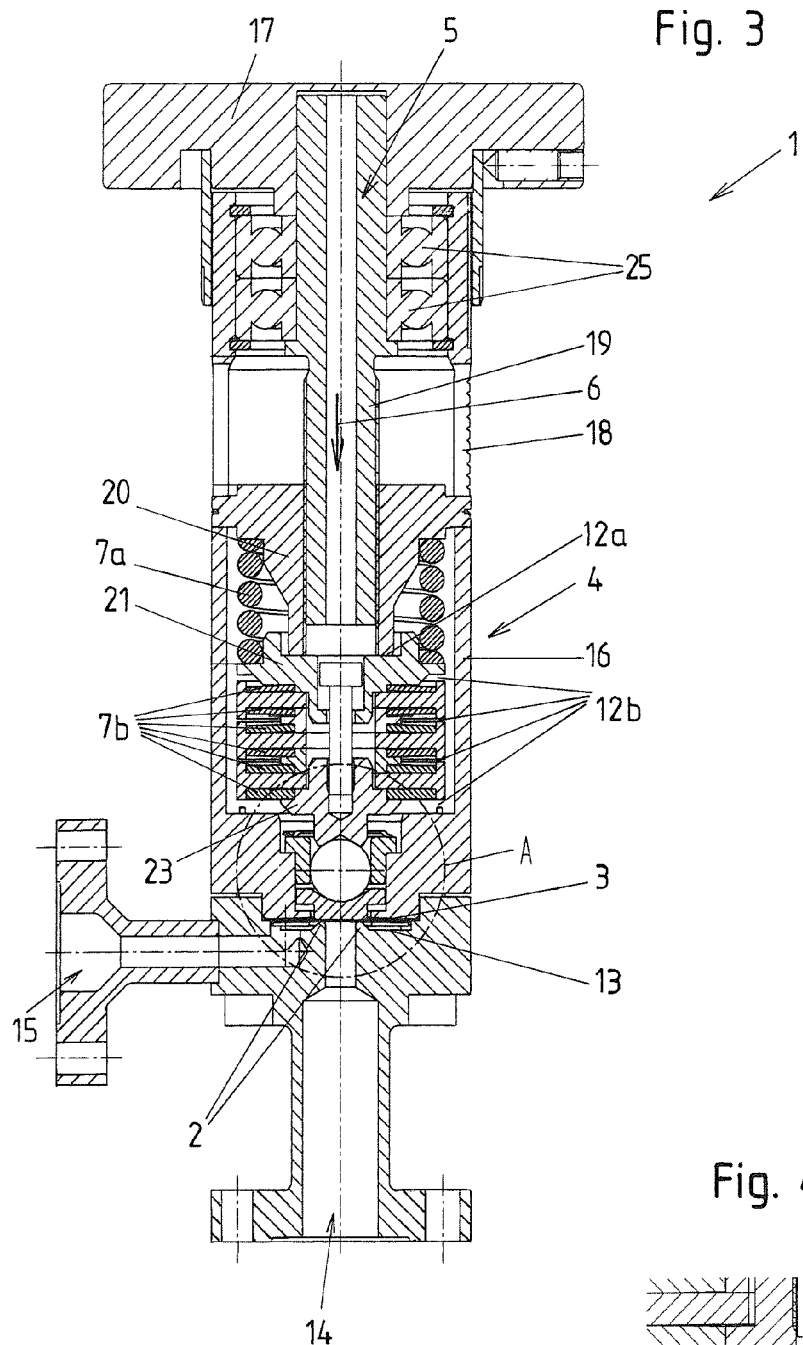
FIG. 3 shows a longitudinal section through said gas metering valve in the case of the first complete abutment of the closure member against the valve seat.

In the perspective view from the outside according to FIG. 1, the housing 16 of the gas metering valve 1 can be seen first of all. The variant shown is a two-part housing 16 with a top and a bottom part. However, this does not have to be like this, it can also be a single-part or more than two-part housing. The housing 16, in this exemplary embodiment, is in all cases closed upward by the manual turning handle 17, which serves as actuator for the adjusting device 5. By turning the manual turning handle 17 in relation to the housing 16, the amount of gas to be metered or the gas flow can be adjusted. The state set at any one moment can be read-off the scale 18. The scale 18 shows where the adjusting device 5 is situated along its closing path 8 or the opposing opening path. The housing 16 has the gas inlet opening 14 and the gas outlet opening 15. The amount of gas, that is to say the gas flow traversing between the gas inlet opening 14 and the gas outlet opening 15 is controlled by means of the closure member 3 and the valve seat 2. However, the gas can also flow around in another manner such that the opening 15 is then the inlet opening and the opening 14 the outlet opening. The gas flow is controlled by means of the closure member 3 and the valve seat 2 in this case too.

FIG. 2 shows a longitudinal section through said gas metering valve 1 according to FIG. 1. In the position shown in FIG. 2, the closure member 3, which in this case is formed by a diaphragm, is situated in the maximum open position, raised from the valve seat 2, in which the gas metering valve 1 is open to its maximum. In this position, the gas entering through the gas inlet opening 14 flows through between the valve seat 2 and the closure member 3 and leaves the gas metering valve again through the gas outlet opening 15, or in reverse. The adjusting of the gas metering valve 1 is effected in the exemplary embodiment shown by turning the manual turning handle 17. A spindle 19 is non-rotatably mounted on the manual turning handle 17. This spindle engages in a nut 20. By turning the manual turning handle 17 and consequently the spindle 19, the nut 20 is moved in the closing direction 6 or in the counter closing direction. So that the nut 20 is not entrained when the spindle 19 is turned, an anti-twist protection 29 is provided, which is guided in corresponding elongated holes 30 in the housing 16 and at the same time forms the scale 18. In the exemplary embodiment shown, the anti-twist protection 29 also forms a longitudinal stop for the adjusting device 5 providing the end positions. This prevents damage to the closure member 3 caused by adjusting the adjusting device 5 too far. Such longitudinal stops which provide the end positions can naturally also be realized in another manner.

The manual turning handle 17, the spindle 19 and the nut 20 are component parts of the adjusting device 5. In addition, the adjusting device 5 also has the spring loading device 4 described below, which, as claimed in the invention, when viewed in the closing direction 6, has several spring bodies 7*a* and 7*b* which are connected mechanically in series, wherein the spring bodies 7*a* and 7*b* have elastic characteristics which are different from each other. In the exemplified embodiment shown, a spiral or helical spring is supported against the nut 20 as a first spring body 7*a*. In the exemplified embodiment shown, in this case this is the most flexible of all the spring bodies 7*a* and 7*b*. All the other spring bodies 7*b* in said exemplified embodiment are realized as cup springs, it having to be pointed out that the six cup springs 7*b* used here also have elastic characteristics that are different from each other, which can be seen by their different thicknesses. On its end turned away from the nut 20, the spring body 7*a* is supported against the first intermediate piece 21. Between the first intermediate piece 21 and the second intermediate piece 23, there is a sequence of spring bodies 7*b* realized in the form of the cup springs and of further intermediate pieces 24 arranged in each case between two adjacent spring bodies 7*b*. The maximum possible spacing between the first intermediate piece 21 and the second intermediate piece 23 can be set by means of the adjusting screw 22. The preliminary tension of the spring bodies 7*a* and 7*b* can also be set in this way. In the exemplary embodiment shown, the rigidity of the spring bodies 7*a* and 7*b*, when seen from the nut 20, increases in each case toward the second intermediate piece 23. This does not necessarily have to be so. In the final analysis, the geometric sequence of the individual spring bodies 7*a* and 7*b* is of secondary importance to the operation of the gas metering valve 1.

In the exemplary embodiment shown, the end of the spindle 19 directed toward the closure member 3 and the opposite surface of the first intermediate piece 21 form a first pair of stops 12*a*. If said stops 12*a* are not in contact with each other, the elastic characteristics of the entire spring loading device 4 are substantially or at least primarily provided by the elastic characteristics of the spring body 7*a*, which is realized in this case as a spiral or helical spring. In the exemplary embodiment shown, this is the case along a first partial path 9 of the closing path 8 in the closing direction 6. In the case of the variant shown, said first partial path 9 corresponds to the positions of the closure member 3, which positions said closure member assumes between the maximum open position according to FIG. 2 and the first complete abutment of the closure member 3 against the valve seat 2, as is shown in FIG. 3. As soon as the two stops 12*a* come into contact with each other, the elastic characteristics of the spring body 7*a* no longer influence the elastic characteristics of the spring loading device 4, as the spring body 7*a* is practically short-circuited or deactivated by means of the stops 12*a*. In the exemplary embodiment shown, the first complete abutment of the closure member 3 against the valve seat 2 shown in FIG. 3 occurs when the stops 12*a*, associated with the first spring body 7*a*, come in to contact with one another. However, this does not necessarily have to be like this.

In any case, the exemplary embodiment shown is such that as soon as the first spring body 7*a* no longer influences the elastic characteristics of the spring loading device 4 through the abutment of the stops 12*a* against one another, said elastic characteristics of the spring loading device 4 are then determined, at least substantially or primarily, by the next-most rigid spring body 7*b*. In the exemplary embodiment shown, in this case this is the cup spring which is arranged directly below the spring body 7*a*, that is to say the cup spring with the thinnest wall. When the gas metering valve 1 is adjusted further in the closing direction 6, said cup spring then provides the elastic characteristics of the spring loading device 4 until the stops 12*b* associated with said cup spring or said spring body 7*b* come into contact with one another. In the exemplary embodiment shown, said stops 12*b* are formed by corresponding surfaces of the first intermediate piece 21 and of the further intermediate piece 24 following thereafter in the closing direction 6 or the edge thereof. If said stops 12*b* abut against one another, the first cup spring 7*b* is thus short-circuited or deactivated. If the adjusting device 5 is adjusted further in the closing direction 6, the elastic characteristics are then provided by the following next-strongest cup spring or said spring body 7*b* until the stops 12*b* associated with said spring body 7*b* come into contact with one another again. This continues in this manner until the last partial path 10 is reached where the elastic characteristics of the spring loading device 4 are provided by the most rigid spring body 7*b*, in this case the bottommost cup spring. At the end of said last partial path 10, the closure member 3 has then reached the maximum closed position. The gas metering valve 1, in the exemplary embodiment shown, is opened by turning the manual turning handle 17 in the opposite direction. The elastic characteristics of the spring loading device 4 are then dominated one after the other by the respective spring bodies 7*b* and 7*a* in the opening direction, which is directed counter to the closing direction 6. In order to raise the closure member 3 from the valve seat 2 from a defined force, the exemplary embodiment shown provides the opening spring 13 which, in this case, is also realized as a cup spring. During the closing operation, just as during the opening operation of the spring loading device 4, the opening spring 13 reacts to the spring loading device with defined elastic characteristics.

Figure 4:
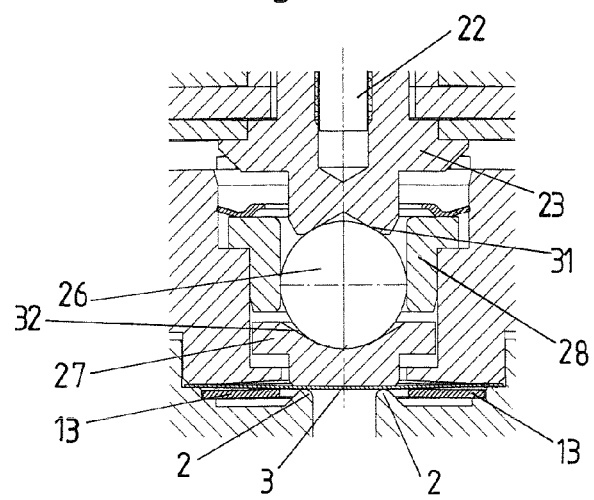
FIG. 4 shows an enlarged representation of the region A from FIG. 3.

FIG. 4 shows an enlarged representation of the detail A from FIG. 3, the closure member 3, which is realized in this case as a diaphragm, being situated in FIG. 4 as in FIG. 3 in the position in which, during the closing operation, it arrives at the named first complete abutment of the closure member 3 against the valve seat 2. As can be seen in FIG. 3, in said position the stops 12a, not however the stops 12b, abut against one another. As stated, however, this can also be coordinated in other exemplary embodiments in another manner.

FIG. 4 shows an enlarged representation of the region around the valve seat 2. The second intermediate piece 23 can be seen first of all. Said second intermediate piece has a notch 31 in which a compensating ball 26 is mounted. The interaction between the compensating ball 26 and the notch 31 and a rounded indentation 32 in the support cup 27 causes force components in the direction orthogonally with respect to the closing direction 6 to be eliminated. In other words, the compensating ball 26 mounted in the guide sleeve 28 ensures that only force components acting in the closing direction 6 or in the opposite opening direction are transmitted by the adjusting device 5 to the closure member 3.

As can be seen particularly well in FIG. 4, the opening spring 13 is arranged in the region of the valve seat 2. In the exemplary embodiment shown, it abuts directly against the closure member 3 and is situated on the side of the closure member 3 opposite the adjusting device 5.

FIG. 5 shows a schematic representation of the spring characteristic of the spring loading device 4, realized as described, of the described exemplary embodiment. The force F acting in the closing direction 6 onto the closure member 3 is applied against the path X of the adjusting device 5 in the closing direction 6. In this case, the reference 8 shows the entire closing path which is comprised of the first partial path 9 and the further partial paths 10. The closing path 8 or the partial paths 9 and 10 are the paths which are indicated by means of the scale 18, that is to say the path of the adjusting device 5 which, in the exemplary embodiment shown, can be adjusted by way of the manual turning handle 17 and can be measured at the nut 20. Force $F_1$ is representative of a force acting on the closure member 3 in the closing direction 6 at the beginning of partial path 9 and force $F_2$ is representative of a similar force at the end of partial path 9. Forces $F_3$, $F_4$, $F_5$, $F_6$, $F_7$, and $F_8$ are representative of forces acting on the closure member 3 in the closing direction 6 at the ends of further partial paths 10.

The elastic characteristics of the spring loading device 4 are provided along the first partial path 9 by the spring body 7a or the spring characteristic thereof. In the exemplary embodiment shown, the closure member 3 comes to the first abutment or to the first complete abutment against the valve seat 2 at the end of the first partial path 9. At the same time, the two stops 12a abut against each other. In the case of the partial path 10 following thereafter in the closing direction, the elastic characteristics of the spring loading device 4 are then determined by the next-strongest spring body 7b, that is to say the topmost cup springs in the exemplary embodiment shown. This can be seen in FIG. 5 by a clear increase in the gradient 11 of the spring characteristic. As the further partial paths 10 are run through, the next-most rigid spring bodies 7b then act in each case until, in each case, the stops 12b associated therewith come into contact with one another. This is continued until at the end of the last partial path 10 which is dominated by the strongest spring body 7b, the maximum closed position of the closure member 3 is reached. It must be pointed out again that in the case of the further partial paths 10 in the exemplary embodiment shown there is hardly any more lift of the closure member 3. Just the pressure acting on the closure member 3 is increased, which, in the final analysis, results in elastic deformation of the closure member 3.

Preferred development forms of the invention provide that the first partial path 9 is at least 80% of the overall closing path 8, in a favourable manner only approximately 20% of the overall force F being applied along said first partial path. The tolerance of the spring characteristic in said region should be small, preferably at +/−5 Newtons per millimeter. In the further partial paths 10, in a favourable manner a maximum total of 20% of the entire closing path 8 is realized, in a preferred manner, however, at least 80% of the overall force being applied. In this case, the tolerances of the spring characteristics can be relatively large, for example at +/−50 Newtons per millimeter. The overall closing path 8 can be between 10 mm and 20 mm, preferably between 14 mm and 18 mm. In the case of the exemplary embodiment shown, the overall closing path 8 is 16 mm. The closure member 3 of said exemplary embodiment is moved along the first partial path 9 of the adjusting device 5 in a preferred manner by a lift of 0.4 mm. The lifts of the closure member 3 are in the majority of cases within the range of less than 1 mm, preferably less than 0.5 mm. In the further partial paths 10, as already depicted, in a favourable manner the result is just elastic deformation of the closure member 3. To complete the picture, it is pointed out that the first complete abutment of the closure member 3 against the valve seat 2 does not necessarily have to be precisely at the end of the first partial path 9. This can also occur prior to this or thereafter. The overall forces applied by the adjusting device 5 at the closure member 3 can be, for example, between 1,500 and 2,000 Newtons, preferably approximately 1,800 Newtons.

KEY TO THE REFERENCE NUMERALS

1 Gas metering valve
2 Valve seat
3 Closure member
4 Spring loading device
5 Adjusting device
6 Closing direction
7a,7b Spring body
8 Closing path
9 First partial path
10 Further partial path
11 Gradient
12a,12b Stop
13 Opening spring
14 Gas inlet opening
15 Gas outlet opening
16 Housing
17 Manual turning handle
18 Scale
19 Spindle
20 Nut
21 First intermediate piece
22 Adjusting screw
23 Second intermediate piece
24 Further intermediate piece
25 Bearing
26 Compensating ball
27 Support cup
28 Guide sleeve
29 Anti-twist protection 30 Elongated hole
31 Notch
32 Rounded indentation

The invention claimed is:

1. A gas metering valve comprising:
a valve seat and a closure member which can be pressed against the valve seat, the closure member in a maximum open position is raised at least in regions from the valve seat and in a maximum closed position is pressed against the valve seat;
an adjusting device spring-loaded by a spring loading device for adjusting the closure member in a closing direction from the maximum open position into the maximum closed position, the spring loading device of the adjusting device having at least two spring bodies which are connected mechanically in series, the spring bodies having elastic characteristics which are different from each other; and
an adjusting screw for setting a preliminary tension of at least one of the spring bodies independently of the adjusting device adjusting the closure member,
wherein the adjusting device, upon adjusting the closure member in the closing direction is movable along a closing path, and
at least one of the spring bodies is more flexible and acts at least primarily on a first partial path of the closing path in the closing direction and at least one other of the spring bodies is more rigid than the more flexible spring body and acts at least primarily on a further partial path of the closing path in the closing direction.

2. The gas metering valve as claimed in claim 1, wherein the adjusting device, upon adjusting the closure member in the closing direction is movable along the closing path, and the at least one of the spring bodies that is configured to be more flexible and acts at least primarily on a first partial path of the closing path when the closure member is situated in at least one state between the maximum open position and a first complete abutment of the closure member against the valve seat, and the at least one other of the spring bodies that is configured to be more rigid than the more flexible spring body and acts at least primarily on a further partial path of the closing path when the closure member is situated in at least one state between the first complete abutment of the closure member against the valve seat and the maximum closed position.

3. The gas metering valve as claimed in claim 1, wherein the adjusting device when adjusting the closure member in the closing direction is movable along the closing path.

4. The gas metering valve as claimed in claim 3, wherein the spring loading device along a first partial path of the closing path has a spring characteristic with a maximum gradient of 25 Newtons per millimeter closing path.

5. The gas metering valve as claimed in claim 4, wherein the at least one of the spring bodies of the spring loading device has the spring characteristic with the maximum gradient of 25 Newtons per millimeter closing path when the closure member is situated in at least one state between the maximum open position and a first complete abutment of the closure member against the valve seat.

6. The gas metering valve as claimed in claim 1, wherein the adjusting device when adjusting the closure member in the closing direction is movable along the closing path, and at least one of the spring bodies of the spring loading device along a further partial path of the closing path has a spring characteristic with a gradient of between 100 Newtons per millimeter closing path and 1000 Newtons per millimeter closing path.

7. The gas metering valve as claimed in claim 6, wherein at least another one of the spring bodies of the spring loading device has the spring characteristic with the gradient of between 100 Newtons per millimeter closing path and 1000 Newtons per millimeter closing path when the adjusting member is situated in at least one state between a first complete abutment of the closure member against the valve seat and the maximum closed position.

8. The gas metering valve as claimed in claim 1, wherein at least one of the spring bodies has associated therewith a stop of the adjusting device, wherein upon reaching the stop, a more extensive adjusting of the closure member in the closing direction is uninfluenced by the spring body with which the stop is associated.

9. The gas metering valve as claimed in claim 1, wherein each of the at least two spring bodies has associated therewith a stop of the adjusting device, wherein upon reaching the stop of one of the two or more spring bodies, a more extensive adjusting of the closure member in the closing direction is uninfluenced by the spring body with which the stop is associated.

10. The gas metering valve as claimed in claim 1, wherein the spring bodies are arranged coaxially with respect to each other.

11. The gas metering valve as claimed in claim 1, wherein the closing path extends in a linear manner.

12. The gas metering valve as claimed in claim 11, wherein the closing path is completely linear.

13. The gas metering valve as claimed in claim 1, wherein at least one of the spring bodies is a spiral spring.

14. The gas metering valve as claimed in claim 1, wherein at least one of the spring bodies is a cup spring.

15. The gas metering valve as claimed in claim 1, wherein the adjusting device when adjusting the closure member in the closing direction is movable along the closing path, at least one of the spring bodies is realized as a spiral spring and acts at least primarily on the first partial path of the closing path, when the closure member is situated in at least one state between the maximum open position and the first complete abutment of the closure member against the valve seat, and at least one other of the spring bodies is realized as a cup spring and acts at least primarily on the further partial path of the closing path, when the closure member is situated in at least one state between a first complete abutment of the closure member against the valve seat and the maximum closed position.

16. The gas metering valve as claimed in claim 1, wherein the gas metering valve has at least one opening spring which is arranged in a region of the valve seat which spring-loads the closure member in opposition to the closing direction.

17. The gas metering valve as claimed in claim 16, wherein the at least one opening spring is a cup spring.

* * * * *